(12) United States Patent
Costea et al.

(10) Patent No.: US 12,345,821 B2
(45) Date of Patent: Jul. 1, 2025

(54) METHOD FOR PREDICTING BEHAVIOR OF OBJECT E AS AN AUTONOMOUS VEHICLES, DETERMINING AFGGREGATED DATA BASED ON FIRST AND SECOND LIDARS DATA AND TRANSFER FUNCTION

(71) Applicant: Zoox, Inc., Foster City, CA (US)

(72) Inventors: Arthur Daniel Costea, San Mateo, CA (US); David Pfeiffer, Foster City, CA (US); Zeng Wang, Foster City, CA (US); Allan Zelener, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 951 days.

(21) Appl. No.: 17/484,169

(22) Filed: Sep. 24, 2021

(65) Prior Publication Data

US 2023/0095410 A1    Mar. 30, 2023

(51) Int. Cl.
| | |
|---|---|
| *G01S 17/931* | (2020.01) |
| *G01B 21/16* | (2006.01) |
| *G01S 7/4863* | (2020.01) |
| *G01S 17/06* | (2006.01) |
| *G06N 20/00* | (2019.01) |
| *G01B 11/02* | (2006.01) |
| *G06F 16/783* | (2019.01) |

(52) U.S. Cl.
CPC .......... *G01S 17/931* (2020.01); *G01B 21/16* (2013.01); *G01S 7/4863* (2013.01); *G01S 17/06* (2013.01); *G06N 20/00* (2019.01); *G01B 11/026* (2013.01); *G06F 16/786* (2019.01)

(58) Field of Classification Search
None
See application file for complete search history.

(56) References Cited

U.S. PATENT DOCUMENTS

| | | | |
|---|---|---|---|
| 11,157,527 B2* | 10/2021 | Wang | G06N 20/00 |
| 2017/0300058 A1 | 10/2017 | Peret et al. | |
| 2018/0356830 A1* | 12/2018 | Haghighat | H04L 67/306 |
| 2019/0249998 A1* | 8/2019 | Rombouts | G01C 21/3837 |
| 2020/0150677 A1 | 5/2020 | Walters et al. | |
| 2020/0211370 A1* | 7/2020 | Chen | G08G 1/0129 |
| 2021/0089040 A1 | 3/2021 | Afrouzi et al. | |

FOREIGN PATENT DOCUMENTS

| | | |
|---|---|---|
| WO | WO2016085717 A1 | 6/2016 |
| WO | WO2020117283 A1 | 6/2020 |

OTHER PUBLICATIONS

PCT Search Report and Written Opinion mailed Dec. 15, 2022 for PCT ApplicationNo. PCT/US2022/076126, 9 pages.
PCT International Preliminary Report on Patentability mailed Apr. 4, 2024 for PCT Application . No.PCT/US2022/076126, 7 pages.

* cited by examiner

*Primary Examiner* — Haris Sabah
(74) *Attorney, Agent, or Firm* — Lee & Hayes, P.C.

(57) ABSTRACT

Techniques for detecting and classifying objects using lidar data are discussed herein. In some cases, the system may be configured to utilize a predetermined number of prior frames of lidar data to assist with detecting and classifying objects. In some implementations, the system may utilize a subset of the data associated with the prior lidar frames together with the full set of data associated with a current frame to detect and classify the objects.

20 Claims, 7 Drawing Sheets

METHOD FOR PREDICTING BEHAVIOR OF OBJECT E AS AN AUTONOMOUS VEHICLES, DETERMINING AFGGREGATED DATA BASED ON FIRST AND SECOND LIDARS DATA AND TRANSFER FUNCTION

BACKGROUND

Autonomous vehicles may navigate along routes. For example, when the autonomous vehicles receive requests to travel to destination locations, the autonomous vehicles may navigate along routes from the current locations of the autonomous vehicles to a pickup location to pick up a passenger and/or from the pickup location to the destination locations. While navigating, the autonomous vehicles may detect other objects in the environment and predict their behavior. Predicting the behavior of each object may include a degree of uncertainty that may create challenges for the vehicle to safely navigate through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

As discussed herein, autonomous vehicles may navigate through physical environments. For example, when an autonomous vehicle receives a request to travel to a destination location, the autonomous vehicle may navigate along a reference trajectory or route from the current location of the autonomous vehicle to a pickup location to pick up a passenger and then from the pickup location to the destination location. While navigating, the autonomous vehicle may encounter dynamic objects (e.g., vehicles, pedestrians, animals, and the like), static objects (e.g., buildings, signage, parked vehicles, and the like) in the environment. In order to ensure the safety of the occupants and objects and make operational decisions, the system and vehicle, discussed herein, may segment, classify, and/or predict a status and/or behavior of the dynamic objects. The predicted behaviors and/or the states may be based on lidar data captured by the autonomous vehicle.

The perception and prediction systems may rely on a current or most recent frame of the lidar data representative of the physical environment as an input to one or more machine learned models or networks associated with the prediction system. The prediction systems may then determine and/or output an identification, classification, state, location or position, and one or more predicted behaviors of the detected objects.

In some cases, the machine learned models and/or networks associated with the prediction system may provide improved segmentation, classification, object identification, state identification, predicted behaviors, and/or the like when the input data includes multiple or N number of prior frames of lidar data together with the current frame. In this manner, the prediction system may utilize temporal data (e.g., changes in the object(s) over time) to assist with segmentation, classification, object identification, state identification, predicted behaviors, and/or the like. For example, steam raising from the road, fog, vehicle exhaust, and/or other (distractors) are often classified as static objects when a single frame is utilized. However, when processing distractors, such as steam, the shape and consistency of the lidar data often changes or varies over multiple frames and, thus, the machine learned models and/or networks can more easily distinguish steam and other distractors from static solid objects, thereby improving the outputs of the prediction system.

However, the operations of the autonomous vehicle may be limited by both processing time (e.g., in terms of milliseconds) as well as available computational resources. In some cases, processing a single lidar frame may require multiple channels (such as in the range of 100 to 200 channels) and processing even two additional prior frames with respect to each frame may triple the processing time and/or resources required. In this manner, temporally processing the lidar data over multiple frames is computationally expensive and difficult to implement in practice.

The system discussed herein, may utilize a top down segmentation and classification to identify both dynamic and static objects within an environment surrounding the autonomous vehicle. In some cases, top-down segmentation and classification refers to the data as input into such a machine learning algorithm. For instance, a machine learned model or network may accept data in the form of a grid where the Z dimension is indicative of a height dimension. In this manner, the data is effectively rotated such that the data may be viewed from above and subsequently input into machine learning models or networks. In some examples, the machine learning models or networks can accept the data that is effectively rotated such that it is viewed from an elevation view or a side view.

In some cases, the system may be configured to represent and align data of the prior frames according to discretized regions of a grid in a top down representation of the physical environment to reduce the overall processing required with the prior N frames of the lidar data while still providing a temporal input to the machine learned models and/or networks. In some cases, the top down representation may be a multichannel image that includes channels representative of the height (such as a maximum height and a minimum height), in the Z dimension, for individual discretized region of the top down representation as well as a value (such as a sensor intensity value). In some cases, the data associated with a current frame may include any number of other channels (such as additional features, objects, characteristics, and the like). In this manner, the system may utilize three channels of the multichannel image to represent regions of the top down representation with respect to the prior N frames and any number of channels with respect to the current frame. The three channels associated with the prior N frames can respectively include information such as a minimum height for a pixel, a maximum height for the pixel, and a lidar intensity for the region or pixel (such as an averaged lidar intensity at the pixel). In this manner, the overall processing of the additional prior frames only fractionally increases the overall computing resources required.

In some examples, alignment of multiple frames, each representing a state of a scene at a corresponding time, can include centering the frames around a vehicle. As disclosed herein, the vehicle can include a sensors system used to generate sensor data for determining a state of the environment (scene) around the vehicle. The alignment can include removing dynamic (e.g., moving) objects to leave static (immobile) objects. The static objects can be used as references to determine to what degree to shift respective scenes so that they are aligned and/or centered on the vehicle. Using this information, the frames (including dynamic and static objects) can be aligned. As should be understood, the vehicle may move independently to static objects and therefore, the offset information can correspond to differences in locations of static objects between frames that can then be applied to all objects in the scene (including the vehicle and dynamic objects). The alignment can include padding or cropping respective frames so that they are of a same size to, for example, prepare the frames for analysis by a perception system.

In the system discussed herein, the data associated with each lidar frame can also be aligned. For example, the lidar data may be aligned based on a current location of the autonomous vehicle, such that a static object within the environment is aligned at the same position in each of the lidar frames. In some cases, the system may align the lidar frames by applying one or more transforms to each of the prior lidar frames to place all the data points within a shared world coordinate system. Once the data points of the N prior lidar frames are aligned, then the system may compute the maximum height and the minimum height for each pixel of each frame as well as the lidar intensity value. The transformed data may then be stacked or placed into a common representation of the physical environment.

In some cases, the one or more transforms applied to the N prior lidar frames may be determined based at least in part on a simultaneous location and mapping (SLAM) technique or system performed by the autonomous vehicle. For example, the vehicle may track its position relative to the physical environment over a series of frames in addition to using global position or other location tracking. The output of the SLAM system may then be used to generate a transform (such as in six degrees of freedom) for each of the prior N frames to transition the corresponding frame data into the common current frame. For example, details associated with pose and/or position determinization are discussed in U.S. patent application Ser. No. 15/675,487, which is herein incorporated by reference in its entirety and for all purposes.

Figure 1:
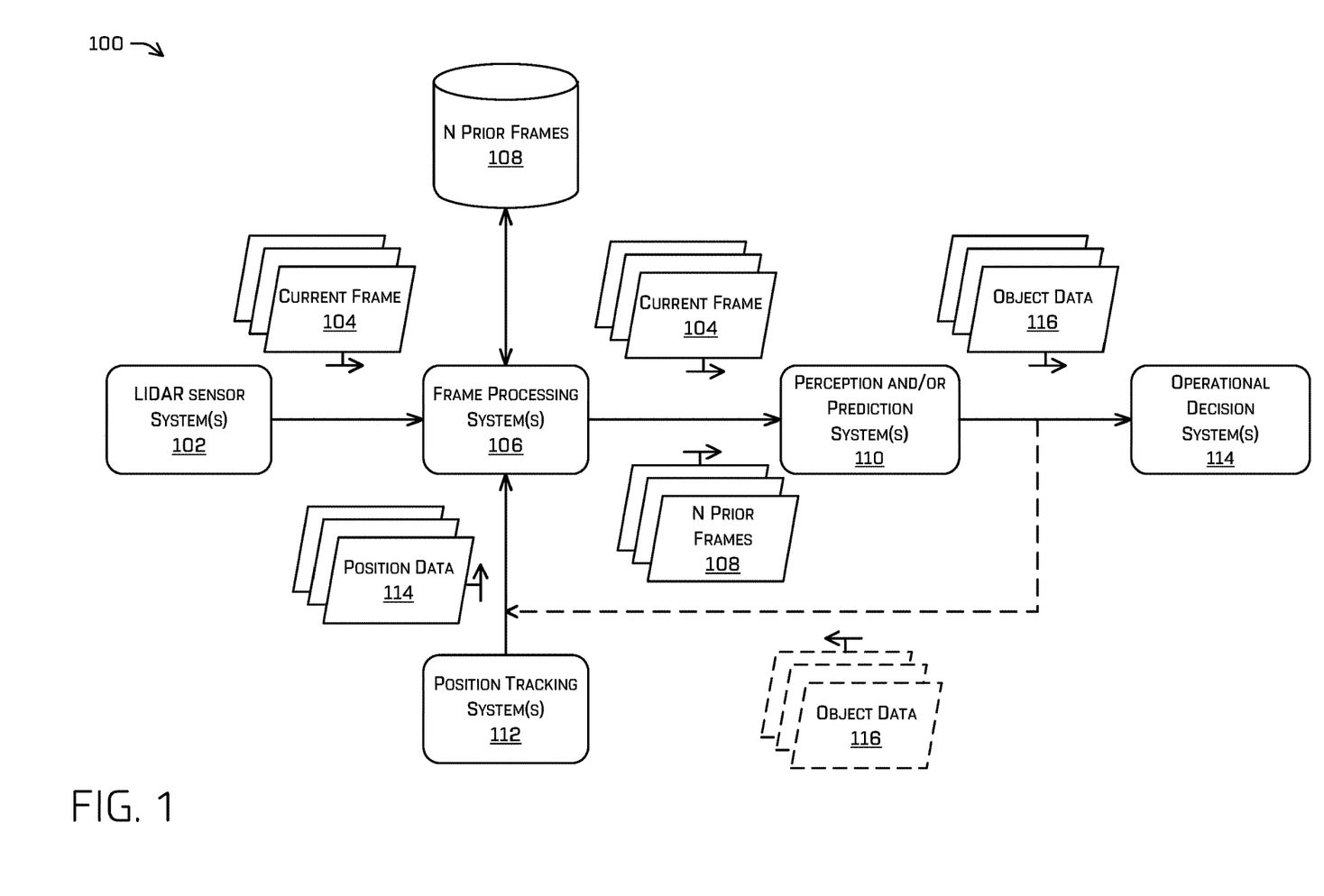
FIG. 1 is an example block-diagram illustrating an example architecture associated with operational decisions of an autonomous vehicle.

FIG. 1 is an example block-diagram illustrating an example architecture 100 associated with operational decisions of an autonomous vehicle, in accordance with embodiments of the disclosure. As discussed above, the autonomous vehicle may be equipped with a lidar sensor system 102 to capture lidar data or frames of a physical environment surrounding the vehicle as the vehicle travels to a destination location. The lidar data may be utilized by the autonomous vehicle to detect and avoid objects along the planned route. The lidar data may be captured in frames at predetermined intervals, such as every millisecond. For example, details associated with lidar sensors and data capture are discussed in U.S. Pat. No. 10,444,759, which is herein incorporated by reference in its entirety and for all purposes.

In some examples, the lidar sensor system 102 may provide a current frame 104 associated with a current interval of time of the sensor 102 to a frame processing system 106. The frame processing system 106 may be configured to provide both the current frame 104 together with a plurality of prior frames 108 to a perception and prediction systems 110. The frame processing system 106 may first reduce the data or channels associated with the prior frames 108 to maintain processing speeds and reduce overall resource consumption associated with providing temporal lidar sensor data history. For example, as discussed above, the perception and prediction systems 110 may process a plurality of channels (e.g., between 100-200 channels) for the current frame with respect to segmenting, classifying, and making multiple predictions and/or generating multiple outputs of machine learned models and/or networks based on the current lidar frame 104. However, processing all of the data associated with multiple prior frames 108 using the same number channels often overloads the processing resources available and/or delays the output of the machine learned models and networks to an extent not suitable for autonomous driving that requires real time decision and reaction times.

Accordingly, in examples, the frame processing system 106 processes and/or reduces the overall data associated with the prior frames 108 before providing them to the perception and prediction systems 110. In some cases, the frame processing system 106 may generate a multichannel top-down representation of the environment for the prior frames 108. The multichannel top-down representation may include three channels for individual discretized regions of the representation. For instance, the channels may include a maximum height, a minimum height, and an intensity value. By representing the temporal data (e.g., the prior frames 108) in this manner, the frame processing system 106 may reduce the amount of data input and processed by the perception and prediction systems 110. In examples, channels representing that depth data can be reduced to as few as three, thereby reducing processing resources and improving processing speeds.

As discussed herein, a multi-channel image may comprise a plurality of channels which may be input into a trained model to determine one or more outputs. In some examples discussed herein, the multi-channel image may be represented as a top-down representation corresponding in which individual channels of a multichannel representation (e.g., image, encoding, matrix representation, etc.) represent different information about objects and/or the surrounding physical environment in which the autonomous vehicle is located. In various examples, each channel of a multi-channel representation can separately encode an attribute, class, feature, and/or signal associated with the sensor data and/or the physical environment. For instance, such channels may correspond to semantic information about the scenario, and may be stored as encodings (e.g., binary masks) which identify the locations and characteristics of particular object types and/or occupancies within a grid representation of the scenario.

In some cases, the individual channels of a multi-channel representation may represent, but are not limited to, one or more of: road network information (e.g., semantic labels indicating lanes, crosswalks, stop lines, lane dividers, stop signs, intersections, traffic lights, and the like), traffic light status (e.g., red light, yellow light, green light, etc.), bounding boxes associated with the autonomous vehicle and/or agents, a velocity of the autonomous vehicle and/or agents in an x-direction and a y-direction, an acceleration of the autonomous vehicle and/or agents in an x-direction and a y-direction, a blinker status of the autonomous vehicle and/or agents (e.g., left-turn, right-turn, braking, reverse, hazards, no lights, etc.), and the like. In some examples, the plurality of channels can be input to the trained model to generate at least one predicted behavior and/or any other prediction related to the state of an object.

The frame processing system 106 may also align the data of the individual frames of the plurality of prior frames 108 with the current frame 104. For example, as the lidar sensor system 102 captures successive lidar frames, both the autonomous vehicle and the lidar sensor system 102 may move within the environment. To accurately represent the object positions within a reference frame associated with the position of the autonomous vehicle, the data associated with the prior frames 108 can be aligned by the frame processing system 106 with the current frame 104 or other frames.

In some cases, the frame processing system 106 may filter or remove dynamic object data prior to alignment. For instance, as illustrated, the object data 116 output by the perception and/or prediction systems 110 may be provided to the frame processing system 106 for using in generating the top down representation of the N prior frames 108. For instance, as the dynamic objects move independently from the autonomous vehicle, the position of the dynamic objects at the current time (e.g., a period of time after the prior frame was captured) may have changed. In one example, the frame processing system 106 may remove and/or filter the dynamic objects by identifying movement within data of the current frame 104. For example, the frame processing system 106 may determine negative space or empty environment between the known sensor origin (e.g., the position of the lidar sensor) and a position of individual lidar points of the lidar point cloud, as the lidar points represents the nearest obstruction and/or object from the position of the lidar sensor. The frame processing system may then determine that data from the prior frames 108 that is associated and/or corresponds to the negative space may be representative of dynamic objects. The frame processing system 106 may then remove and/or filter the data associated with the dynamic objects (e.g., within the negative space) from multichannel top down representation generated based at least in part on the data associated with the prior frames 108.

In other examples, the frame processing system 106 may filter the data associated with the dynamic objects from the N prior frames 108 based at least in part on the object data 116. In this manner, by removing or filtering the dynamic objects from the data of the prior frames, the alignment may be performed without relying on predicted behaviors and/or positions of the dynamic objects. Alternatively, the frame processing system 106 may, in some cases, process the dynamic objects as static objects. In still other alternative examples, the system may align the dynamic object data within the individual frames, determine an overlap and/or average position and designated occupancy of the top down representation based on the overlapping data and/or the averaged position data. and In some cases, the autonomous vehicle may also implement a position tracking system 112 to generate position data 114. For example, the position tracking system 112 may be SLAM systems, satellite based location tracking systems (e.g., a global positioning system (GPS)), cellular network based tracking systems, known landmark based tracking systems, and/or the like. The frame processing system 106 may utilize the position data 114 to generate one or more translations and/or rotations (such as translations and rotations within six degrees of freedom) between a prior position of the autonomous vehicle and/or the lidar sensor system 102 and a current position of the autonomous vehicle and/or the lidar sensor system 102 in, for example, a world frame or coordinate system.

Once the individual frames of the prior frames 108 are aligned based on a common reference frame (e.g., a global world frame or local vehicle frame), the frame processing system 106 may input the prior frames 108 together with the current frame 104 into the perception and prediction systems 110. As discussed above, the perception systems may segment and classify the object represented within the lidar data of the current frame 104 and/or the prior frames 108. The prediction systems may utilize the object data generated by the perception systems to determine a state and/or a predicted behavior of the objects. For example, details associated with the prediction systems and perception systems are discussed in U.S. application Ser. Nos. 16/238,475 and 16/732,243, which are herein incorporated by reference in their entirety and for all purposes. Together, the perception and/or prediction systems 110 may generate object data 116 (e.g., segmented and classified objects, features of the objects, states of the object, predicted behaviors of the objects, and the like). The object data 116 is then processed by an operational decision system 114 (such as a planning system, drive system, safety system, and the like) to make operational decisions for the autonomous vehicle.

Figure 2:
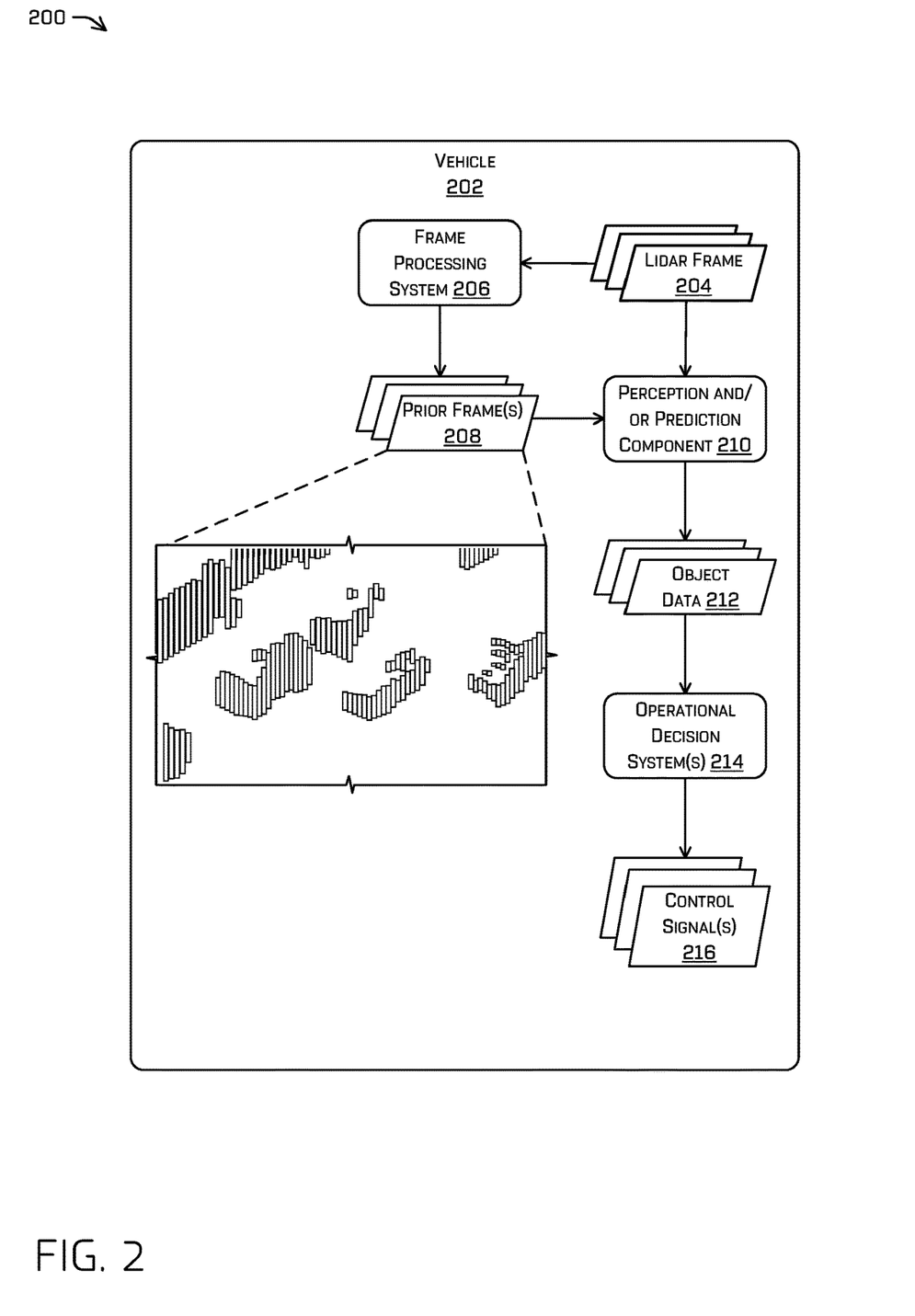
FIG. 2 is another example block-diagram illustrating an example architecture associated with operational decisions of an autonomous vehicle.

FIG. 2 is another example block-diagram illustrating an example architecture 200 associated with operational decisions of an autonomous vehicle 202, in accordance with embodiments of the disclosure. As discussed above, the autonomous vehicle 202 may be equipped with a sensor system to capture data or frames (such as lidar data, image data, or the like) of a physical environment surrounding the vehicle 202 as the vehicle traverses a planned trajectory or route from a current location to a destination location.

In the current example, a current frame 204 associated with a current interval of time of the capturing sensor is received by a frame processing system 206. The frame processing system 206 may be configured to reduce data associated with a predetermined number of prior frames 208 of data (e.g., lidar data captured during prior time intervals) before inputting the prior frames 208 into one or more perception and prediction systems 210. In some cases, the predetermined number of prior frames 208 may be determined based on various conditions associated with the autonomous vehicle 202. For example, the velocity, acceleration, deceleration, weather conditions (e.g., snow, dry, fog, and the like), road conditions (e.g., straight, incline, decline, curves, deterioration, number of lanes, and the like).

In some examples, the frame processing system 206 may reduce the data or channels associated with the prior frames 208 to maintain processing speeds and reduce overall resource consumption associated with the perception and/or prediction systems 210. For example, as discussed above, the perception and/or prediction systems 210 may process a plurality of channels (e.g., between 100-200 channels) for the current frame 204 together with three or more channels for each of the predetermined number of prior frames 208 using one or more machine learned models and/or networks. In some cases, individual channels may be used for each prior frame. In other cases, the channels associated with the prior frames may be combined, averaged, or otherwise consistent between frames. In some specific examples, the channels may be determined based at least in part on the resulting top down representation. For instance, a number of channels may be overlapping and/or otherwise shared between frames or the like. In some cases, details associated with the segmentation and machine learned models are discussed in U.S. Pat. Nos. 10,535,138 and 10,649,459, which are herein incorporated by reference in their entirety and for all purposes.

In some examples, the frame processing system 206 may also align the data of the individual frames of the plurality of prior frames 208 with a world frame or vehicle frame used by the current frame 204 prior to inputting the top down representation into the machine learned models and networks of the perception and/or prediction systems 210. For example, as the autonomous vehicle 202 moves within the environment the position from which the lidar frames 204 and 208 are captured is changed. The frame processing system 206 may then align the data from the individual frames to a common reference position or coordinate system to accurately represent the object positions based on a current location of the autonomous vehicle.

In some examples, the frame processing system 206 may align the data of the prior frames 208 by generating a triangular mesh (or other mesh) based at least in part on the lidar point clouds associated with individual frames of the prior frames 208. The frame processing system 206 may then remove dynamic object data from the triangular mesh based on, for example, detection of motion by determining negative space or empty environment associated with the current frame 204 and removing data within the negative space or empty environment in the prior frames 208. The frame processing system 206 may then determine the transformations from the position of prior frame 208 to the position at the current frame 204. In some cases, the frame processing system 206 may determine translations between the position of the prior frame 208 and the position of the current frame 204 while ignoring rotations to further improve processing speeds. In other cases, the frame processing system 206 may determine the transformations in two dimensions to again improve processing speed, as its unlikely that an object experienced vertical position changes.

In some cases, the frame processing system 206 may reduce the overall data associated with the prior frames 208 before providing them to the perception and prediction systems 210, as discussed above. For example, the frame processing system 206 may generate a top-down representation of the environment using the prior frames 208. The top-down representation may be multichannel and include individual discretized regions of the physical environment that shares aligned data from individual frames. In some examples, individual regions may include data representing a maximum height, a minimum height, and an intensity value. In some examples, once the data of the prior frames 208 are aligned within the top down representation, the frame processing system 206 may determine for individual regions of the top down representation a maximum height, a minimum height, and an average intensity value. In this manner, the occupancy of the region of the top down representation may be represented as a continuous vertical expanse having a top surface and a bottom surface. While the continuous vertical expanse may provide less detail with respect to the objects shape and/or bounding area, the continues vertical expanse may be processed, stored, and sent using less processing resources.

In examples, a multichannel representation of multiple frames can include channel(s) for each of the frames. For example, each of the frames can correspond to a different point in time and channel(s) can encode information corresponding to each of the points in time. This can include heights of objects encoded as disclosed herein, wherein each point in time can have three channels used for encoding height information. In some examples, channels that share information corresponding to multiple points in time can be shared between frames. For example, if frames are not centered on a vehicle moving in an environment and are instead focused on a static point, then channels containing static object information can be shared.

In some cases, the frame processing system 206 may generate one or more translation and/or rotations between data of the individual frames and the current position of the vehicle 202. For instance, the frame processing system 206 may receive position data from SLAM systems, satellite based location tracking systems, cellular network based tracking systems, known landmark based tracking systems, and/or the like, as discussed above. The frame processing system 206 may utilize the position data to generate the one or more translations and/or rotations for each individual prior frame prior to applying the one or more translations and/or rotations the data of the corresponding prior frame 208.

Once the individual frames of the prior frames 208 are aligned, the frame processing system 206 may input the prior frames 208 together with the current frame 204 into the perception and/or prediction systems 210 to segment, detect, classify, and generate predictions associated with the behavior of the detected objects within the physical environment surrounding the autonomous vehicle 202. The perception and/or prediction systems 210 may then generate object data 212 that may be processed by one or more operational decision systems 214 to plan and execute operations associated with the autonomous vehicle 202 via control signals 216.

Figure 3:
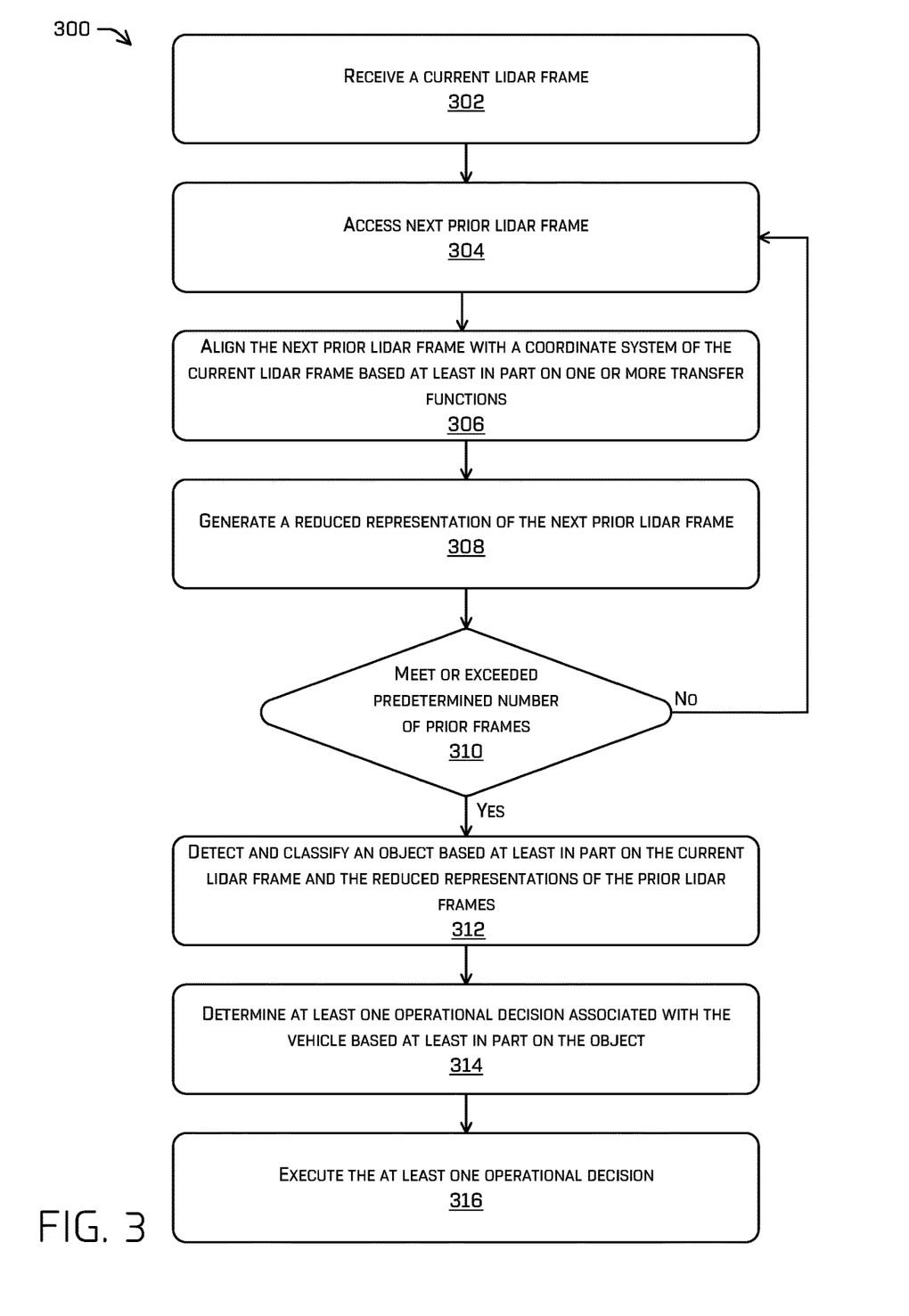
FIG. 3 is a flow diagram illustrating an example process associated with the temporal sensor data systems.
Figure 4:
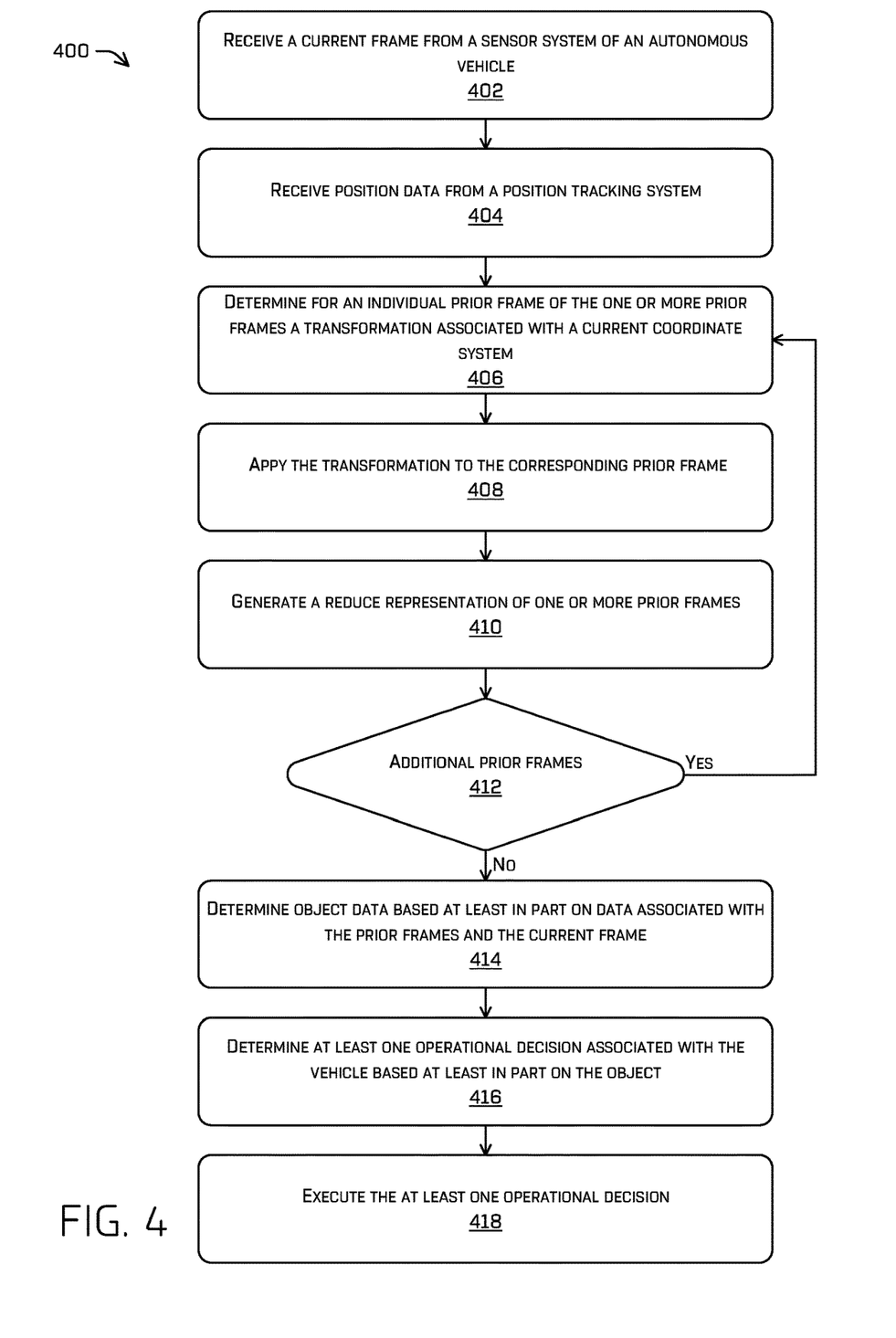
FIG. 4 is another flow diagram illustrating an example process associated with the temporal sensor data systems.

FIGS. 3-4 are flow diagrams illustrating example processes associated with the temporal sensor data system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 is a flow diagram illustrating an example process 300 associated with the temporal sensor data systems, in accordance with examples of the disclosure. As discussed above, an autonomous vehicle may be equipped with a sensor system (e.g., one or more lidar sensors) to capture data or frames of a physical environment surrounding the vehicle. The lidar data may be utilized by the autonomous vehicle to detect and respond to dynamic and static objects along the planned route.

At 302, the vehicle or a system associated therewith may receive a current lidar frame from a sensor system. For example, the vehicle may be equipped with one or more lidar sensor systems to generate frames or ticks of lidar data associated with a predetermined interval of time. The lidar data may represent objects within a predetermined distance of a surrounding physical environment. In some cases, the current lidar frame may be associated with a current global position, coordinates, or frame of the vehicle.

At 304, the vehicle or a system associated therewith may access a next prior lidar frame. For example, the vehicle may store at least a portion of the data associated with a plurality of prior lidar frames, such as a predetermined number of prior lidar frames. In some cases, the number of prior lidar frames stored may be determined based on various characteristics associated with the current vehicle, such as the planned route or trajectory, safety settings, environmental conditions, type of vehicle, number and/or presence of passengers, and/or the like.

At 306, the vehicle or a system associated therewith may align the next prior lidar frame with a coordinate system of the current lidar frame based at least in part on one or more transfer functions. For instance, a center or predetermined reference point of the vehicle (such as a position of a lidar sensor) may be used or selected as a center for the current coordinate system. In some cases, the vehicle also may implement one or more SLAM tracking systems that may be used to determine changes in relative position between a prior position of the vehicle, at a prior time, and a current position of the vehicle, at a current time. For example, the SLAM system may track key points or feature correspondences between relative or subsequent poses of detected environmental objects. The system may utilize the relative key points as well as inertial measurement unit (IMU) data to determine the relative change in position (e.g., over up to six degrees of freedom) and/or to generate the position data for each individual frame. In this manner, the transformation between a prior frame and a current frame may include an accumulation of the changes in each degree of freedom or each translation and rotation of the intervening frames. Accordingly, for individual frames, the system may determine a transformation (such as one or more translations and/or rotations) between the center or predetermined reference point of the vehicle as an independent transformation. The system may then apply the transformation to the data of the corresponding prior frame to align the data of the frame with the current position of the vehicle. In this manner, it should be understood, that the system may determine an independent transformation for each frame of the prior frames to align the data of the frame with the current coordinate system.

At 308, the vehicle or a system associated therewith may generate a reduced representation of the next prior lidar frame. For example, the vehicle may reduce the data associated with lidar points such that the vehicle maintains a maximum height value, a minimum height value, and an intensity for the individual lidar points represented within the next prior lidar frame. In some cases, the reduced representation may include a top-down representation that stores pixels or regions of the environment including an occupancy and a maximum and minimum heights of the occupant of the individual pixels or regions. In some cases, the system may further reduce the data associated with the prior frames by filtering and/or removing dynamic object data based at least in part on the segmentation and classification results of the frame as determined in the prior period of time (e.g., when the prior frame was a current frame). In this manner, the system may avoid providing additional channels associated with predicted behaviors and/or locations of dynamic objects at present time (e.g., a future time with respect to the captured prior frame).

At 310, the vehicle or a system associated therewith may determine if the vehicle has met or exceeded a predetermined number of prior frames. For example, the vehicle may iteratively reduce the data associated with individual frames and determine the transfer functions to align the data of the frame with the current coordinate system until a predetermined number of prior frames are included in the input data for the perception and/or predictions systems. If the predetermined number of prior frames is not met or exceeded, the process 300 may return to 304. Otherwise, the process 300 may advance to 312.

At 312, the vehicle or a system associated therewith may detect and classify an object based at least in part on the current lidar frame and the reduced representations of the prior lidar frames. For example, as discussed above, detecting and classifying some types of objects/environmental conditions, such as steam, fog, exhaust, and the like using lidar data may be difficult using a single lidar frame. However, by utilizing multiple lidar frames the perception and/or prediction systems may detect changes in the lidar points with respect to the steam, fog, exhaust, and the like and, thus, more accurately classify the environmental condition, such as in this case, as a distractor rather than a solid object to avoid.

At 314, the vehicle or a system associated therewith may determine at least one operational decision associated with the vehicle based at least in part on the object and, at 316, the vehicle may execute the at least one operational decision. For example, the vehicle may accelerate, decelerate, turn, change lanes, and the like based at least in part on the object data associated with the detected object. In the specific example of the steam, fog, exhaust, discussed above, the vehicle may simply continue as planned.

FIG. 4 is another flow diagram illustrating an example process 400 associated with the temporal sensor data systems, in accordance with examples of the disclosure. As discussed above, an autonomous vehicle may be equipped with a sensor system (e.g., one or more lidar sensors) to capture data or frames of a physical environment surrounding the vehicle. The lidar data may be utilized by the autonomous vehicle to detect and respond to dynamic and static objects along the planned route.

At 402, the vehicle or a system associated therewith may receive a current lidar frame from a sensor system. For example, the autonomous vehicle may be equipped with one or more lidar sensor systems to generate frames or ticks of lidar data associated with a predetermined interval of time. The lidar data may represent objects within a predetermined distance of a surrounding physical environment. In some cases, the current lidar frame may be associated with a current global position, coordinates, or frame of the vehicle.

At 404, the system may receive position data from a position tracking system. For example, the vehicle may implement one or more SLAM tracking systems, satellite based location tracking systems, cellular network based tracking systems, known landmark based tracking systems, and/or the like. The position data may represent a change in position between a prior position of the vehicle at a prior time (such as an interval associated with the prior frame) and a current position of the vehicle (e.g., the position at which the current frame was captured).

At 406, the system may determine for individual prior frames of the one or more prior frames a transformation, such as at least one transfer function (e.g., one or more translations and/or rotations), to align the individual prior frame with a current coordinate system of the autonomous vehicle, and, at 408, the system may apply the transformation to the corresponding prior frame. For example, the system may determine one or more translations and/or rotations between the current position of the vehicle and a position at which the next prior frame was captured based at least in part on the position data. In this manner, the system may determine a customized transfer function(s) for each individual frame of the prior frames.

At 410, the system may generate a reduced representation of the one or more prior frames. For example, the system may reduce the data associated with lidar points such that the vehicle maintains a maximum height value, a minimum height value, and an intensity for the individual lidar points represented within the next prior lidar frame. In some cases, the reduced representation may include a top-down representation that stores pixels or regions of the environment based at least in part on occupancy and a maximum and minimum heights of the occupant of the individual pixels or regions.

At 412, the process 400 may determine if any additional prior frames. If there are additional prior frames, the process 400 may return to 406. Otherwise, the process 400 may proceed to 414. At 414, the system may determine object data based at least in part on data associated with the prior frames and the current frame. For example, the system may input the data into one or more machine learned models and/or networks trained to segment, detect, classify, and determine features or characterizations associated with the detected objects. For instance, as discussed above, the models and/or networks may be associated with one or more perception systems and/or prediction systems.

At 416, the vehicle or a system associated therewith may determine at least one operational decision associated with the vehicle based at least in part on the object and, at 418, the vehicle may execute the at least one operational decision. For example, the vehicle may accelerate, decelerate, turn, change lanes, and the like based at least in part on the object data associated with the detected object. In the specific example of the steam, fog, exhaust, discussed above, the vehicle may simply continue as planned.

Figure 5:
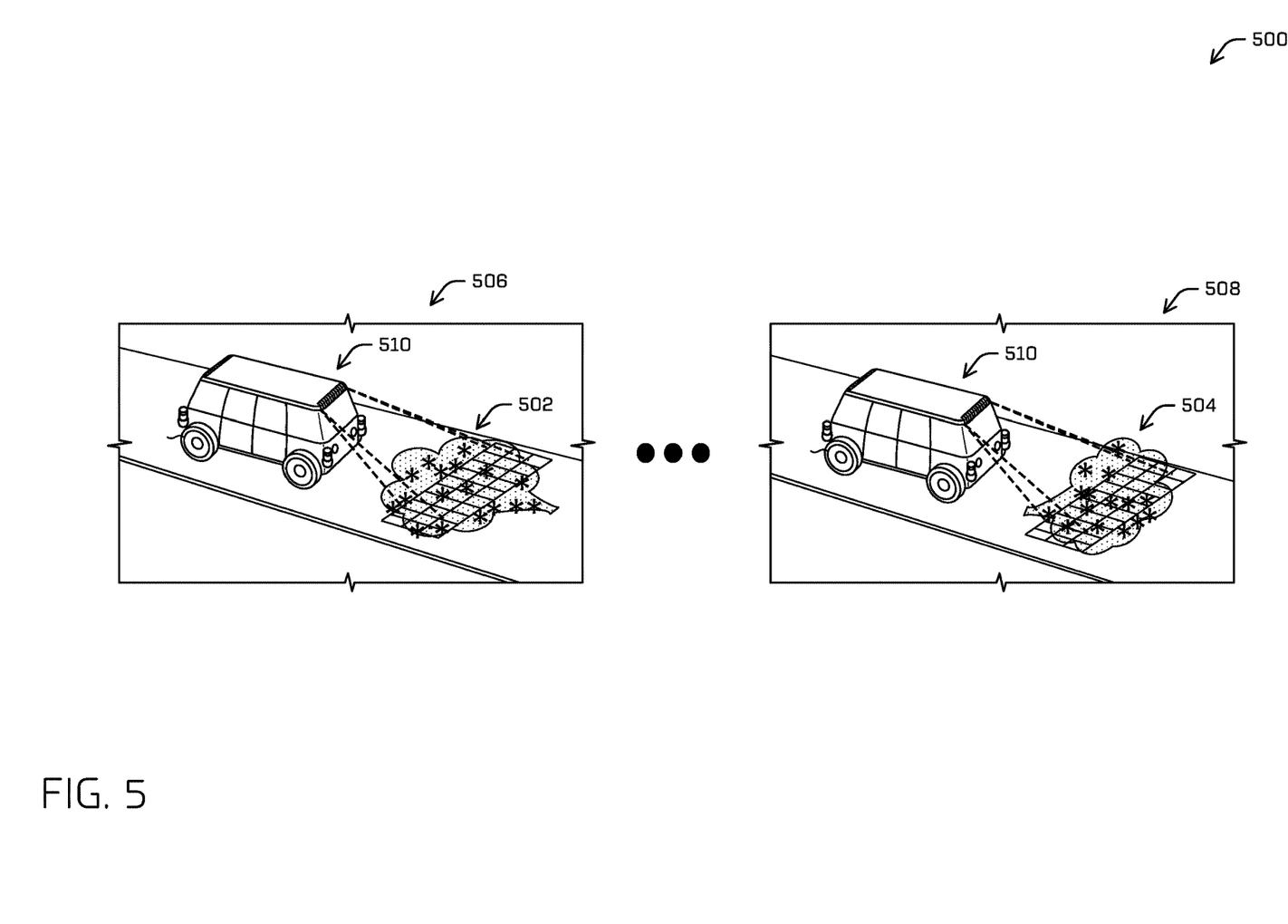
FIG. 5 is a pictorial diagram illustrating an example of lidar data and captured at two intervals associated with the lidar sensor system of an autonomous vehicle.

FIG. 5 is a pictorial diagram illustrating an example 500 of lidar data 502 and 504 captured at two intervals 506 and 508 associated with the lidar sensor system of an autonomous vehicle 510, in accordance with examples of the disclosure. The current example illustrates how utilizing the prior frames of the lidar data 502 when making operational decision within the interval 508 may assist the perception systems and the prediction systems in more accurately detecting and classifying objects. For instance, lidar points of the lidar data 502 and 504 represent steam rising from a grate along the road. As illustrated, the lidar points of the lidar data 502 have changed with respect to the lidar points of the lidar data 504. In this manner, the perception systems and the prediction systems of the vehicle 510 may more likely classify the steam as steam, as opposed to a solid object, based on the known changes within the lidar points between at least the interval 506 and 508, as lidar points associated with solid objects don't change.

Figure 6:
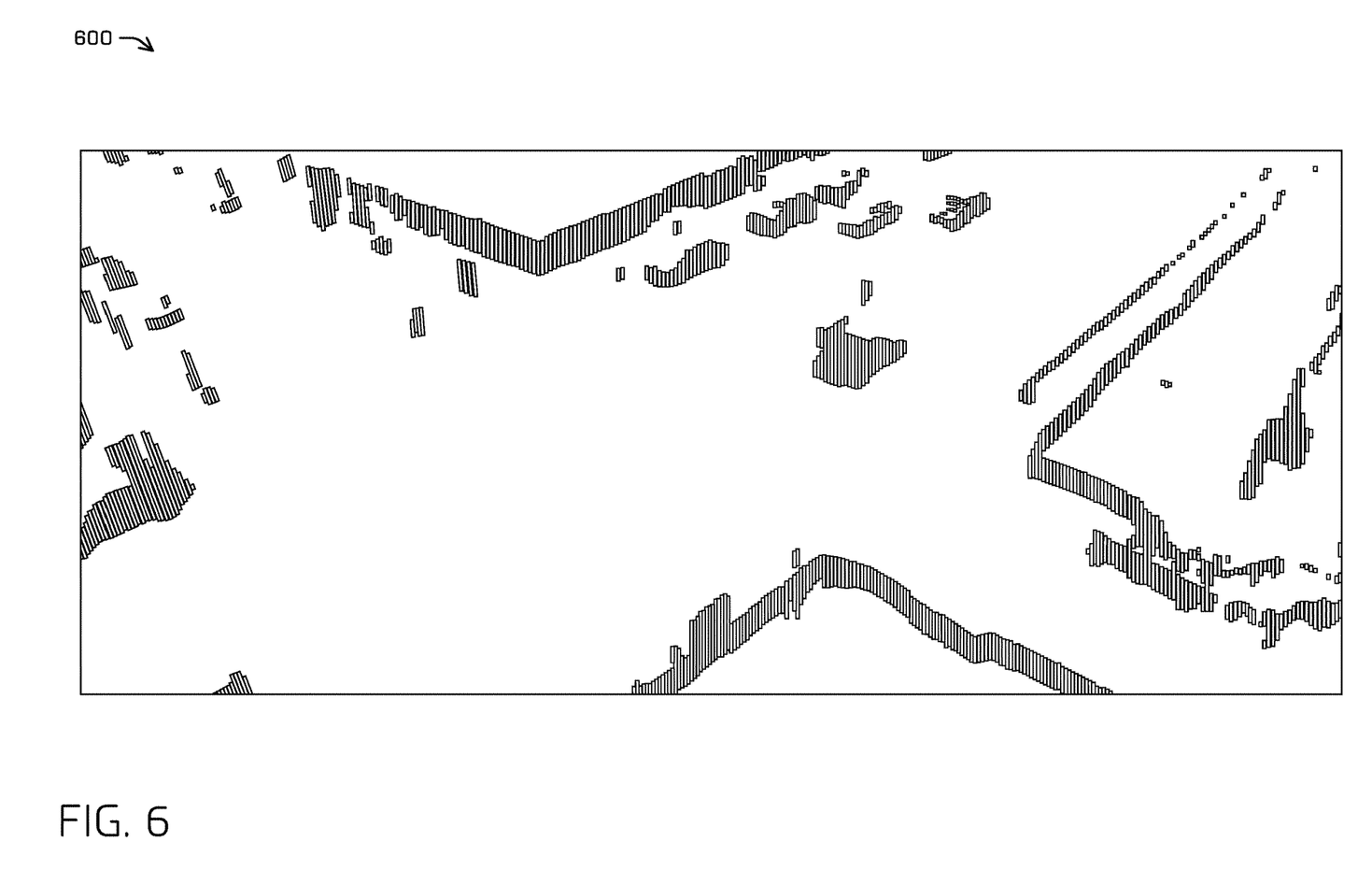
FIG. 6 is another pictorial diagram illustrating an example top down representation of lidar data.

FIG. 6 is another pictorial diagram illustrating an example representation 600 of lidar data, in accordance with examples of the disclosure. In the current example, the objects represented by the lidar data may be represented as a continuous vertical expanse between a maximum height value and a minimum height value within individual pre- defined regions of the environment. For example, individual regions may be associated with a maximum height, a minimum height, and an intensity value that are used to visually represent the occupancy of the corresponding region. In this manner, the total data to be processed by the perception systems and/or the prediction systems may be reduced with respect to individual frames of the lidar data.

Figure 7:
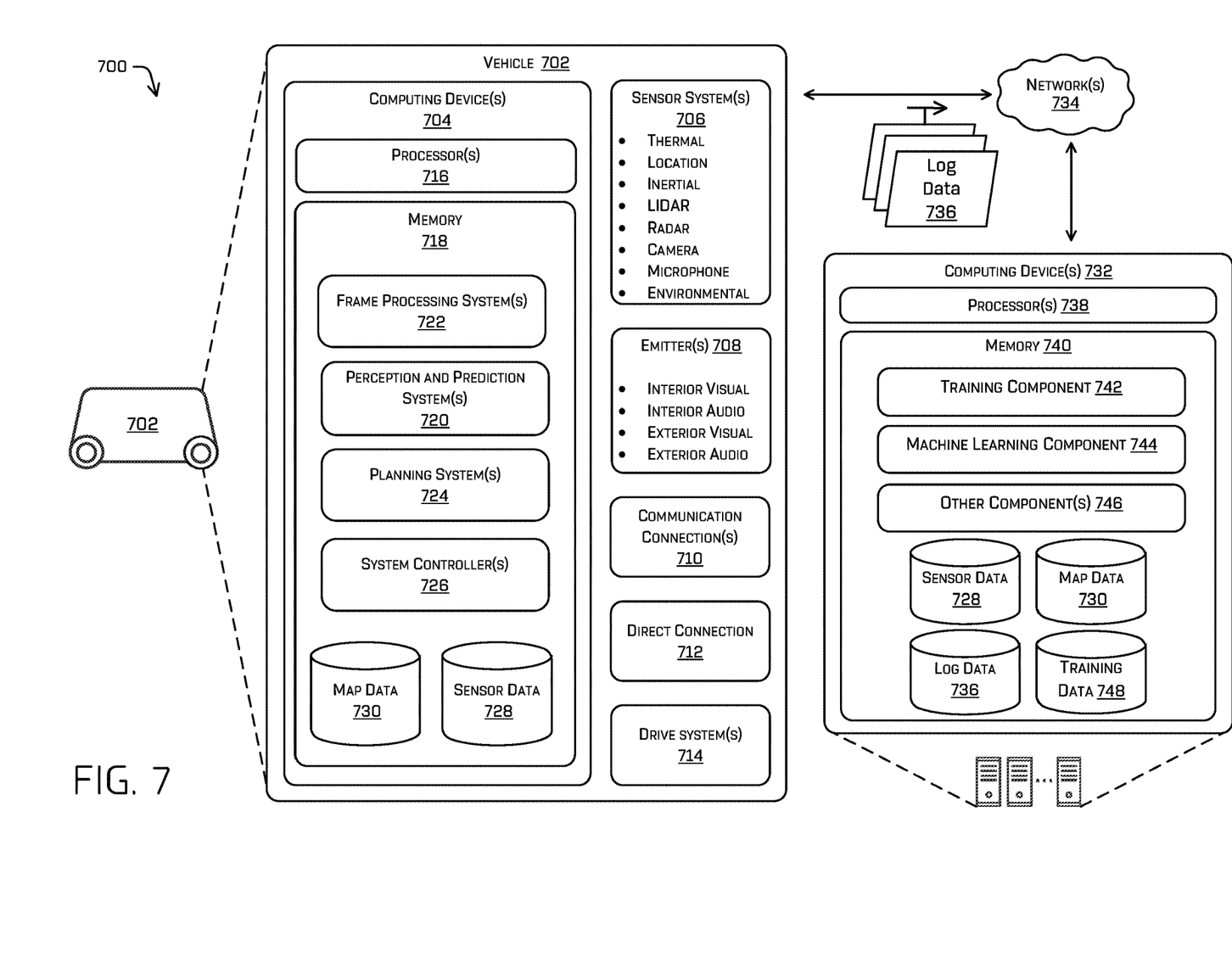
FIG. 7 depicts a block diagram of an example system for implementing the techniques discussed herein.

FIG. 7 depicts a block diagram of an example system 700 for implementing the techniques discussed herein. In at least one example, the system 700 may include a vehicle 702, such the autonomous vehicles discussed above. The vehicle 702 may include computing device(s) 704, one or more sensor system(s) 706, one or more emitter(s) 708, one or more communication connection(s) 710 (also referred to as communication devices and/or modems), at least one direct connection 712 (e.g., for physically coupling with the vehicle 702 to exchange data and/or to provide power), and one or more drive system(s) 714. The one or more sensor system(s) 706 may be configured to capture the sensor data 728 associated with a surrounding physical environment.

In at least some examples, the sensor system(s) 706 may include thermal sensors, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 706 may include multiple instances of each type of sensors. For instance, time-of-flight sensors may include individual time-of-flight sensors located at the corners, front, back, sides, and/or top of the vehicle 702. As another example, camera sensors may include multiple cameras disposed at various locations about the exterior and/or interior of the vehicle 702. In some cases, the sensor system(s) 706 may provide input to the computing device(s) 704.

The vehicle 702 may also include one or more emitter(s) 708 for emitting light and/or sound. The one or more emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also includes exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 can also include one or more communication connection(s) 710 that enables communication between the vehicle 702 and one or more other local or remote computing device(s) (e.g., a remote teleoperations computing device) or remote services. For instance, the communication connection(s) 710 can facilitate communication with other local computing device(s) on the vehicle 702 and/or the drive system(s) 714. Also, the communication connection(s) 710 may allow the vehicle 702 to communicate with other nearby computing device(s) (e.g., other nearby vehicles, traffic signals, etc.).

The communications connection(s) 710 may include physical and/or logical interfaces for connecting the computing device(s) 704 to another computing device or one or more external network(s) 734 (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 710 may comprise the one or more modems as described in detail above.

In at least one example, the vehicle 702 may include one or more drive system(s) 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 can include one or more sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 714. In some cases, the sensor system(s) 706 on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which may receive and preprocess data from the sensor system(s) 706 and to control operation of the various vehicle systems. In some examples, the drive system controller can include one or more processor(s) and memory communicatively coupled with the one or more processor(s). The memory can store one or more modules to perform various functionalities of the drive system(s) 714. Furthermore, the drive system(s) 714 also include one or more communication connection(s) that enable communication by the respective drive system with one or more other local or remote computing device(s).

The computing device(s) 704 may include one or more processors 716 and one or more memories 718 communicatively coupled with the processor(s) 716. In the illustrated example, the memory 718 of the computing device(s) 704 stores perception and prediction system(s) 720, frame processing system(s) 722, planning system(s) 724, as well as one or more system controller(s) 726. The memory 718 may also store data such as sensor data 728 captured or collected by the one or more sensors systems 706 and map data 730. Though depicted as residing in the memory 718 for illustrative purposes, it is contemplated that the perception and prediction system(s) 720, the frame processing system(s) 722, the planning system(s) 724, as well as one or more system controller(s) 726 may additionally, or alternatively, be accessible to the computing device(s) 704 (e.g., stored in a different component of vehicle 702 and/or be accessible to the vehicle 702 (e.g., stored remotely).

The perception and prediction system 720 may be configured to perform object detection, segmentation, and/or category on the sensor data 728 and/or the map data 730. In some examples, the perception and prediction system 720 may generate processed perception data from the sensor data 728. The perception data may indicate a presence of objects that are in physical proximity to the vehicle 702 and/or a classification or type of the objects (e.g., car, pedestrian, cyclist, building, tree, road surface, curb, sidewalk, unknown, etc.). In some cases, the perception data may in integrated into the map data 730 such as via a semantic layer of a multi-resolution voxel space. In additional and/or alternative examples, the perception and prediction system 720 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc.

The perception and prediction system 720 may also be configured to determine a predicted behavior and/or state corresponding to an identified object. For example, the perception and prediction system 720 may be configured to predict a velocity, position, change in trajectory, or otherwise predict the decisions and movement of the identified objects. For example, the perception and prediction system 720 may include one or more machine learned models that may, based on inputs such as object type or classification and object characteristics, output predicted characteristics of the object at one or more future points in time. In some cases, the predicted behaviors and/or states may be assigned a confidence value, such that the behaviors and/or states may be sorted, ranked, and/or the like.

The frame processing system 722 is illustrated as a separate system from the perception and prediction system 720 but it should be understood that in some examples, the frame processing system 722 may be integrated into the perception and prediction system 720. In some cases, the frame processing system 722 may be configured to provide both the current frame together with a plurality of prior frames to the perception and prediction systems 720. The frame processing system 722 may first reduce the data or channels associated with the prior frames to maintain processing speeds and reduce overall resource consumption associated with providing temporal lidar sensor data history. For example, as discussed above, the perception and prediction systems 720 may process a plurality of channels (e.g., between 100-200 channels) for the current frame with respect to segmenting, classifying, and making multiple predictions and/or generating multiple outputs of machine learned models and/or networks based on the current lidar frame. However, processing all of the data associated with multiple prior frames using the same number channels often overloads the processing resources available and/or delays the output of the machine learned models and networks. Accordingly, in this example, the frame processing system 722 may process and/or reduce the overall data associated with the prior frames before providing them to the perception and prediction systems 720. In some cases, the frame processing system 722 may generate a top down segmentation or representation of the environment for the prior frames. For example, the frame processing system 722 may represent individual pixels or regions of the environment based at least in part on a minimum depth value, a maximum depth value, and an intensity value. By representing the temporal data (e.g., the prior frames) in this manner, the frame processing system 106 may reduce the number of channels input into the perception and prediction systems 720 to as few as three, thereby reducing processing resources and improving processing speeds.

The frame processing system 722 may also align the data of the individual frames of the plurality of prior frames with the current frame. For example, as the lidar sensor system captures successive lidar frames, both the autonomous vehicle and the lidar sensor system may move within the environment. To accurately represent the object positions within a reference frame associated with the position of the autonomous vehicle, the data associated with the prior frames is aligned by the frame processing system 722 with the current frame. For example, the frame processing system 722 may utilize position data generated by a position tracking system to generate one or more translations and/or rotations (such as translations and rotations within six degrees of freedom) between a prior position of the autonomous vehicle and a current position of the autonomous vehicle in, for example, a world frame. And then apply the translations and/or rotations is to individual frames of the lidar data to align the data associated therewith.

The planning system 724 may be configured to determine a route for the vehicle 702 to follow to traverse through an environment. For example, the planning system 724 may determine various routes and paths and various levels of detail based at least in part on the identified objects, the predicted behaviors, states and/or characteristics of the object at future times, the confidence value associated with each predicted behavior or state, and a set of safety requirements corresponding to the current scenario (e.g., combination of objects detected and/or environmental conditions). In some instances, the planning system 726 may determine a route to travel from a first location (e.g., a current location) to a second location (e.g., a target location) in order to avoid an object obstructing or blocking a planned path of the vehicle 702. In some case, a route can be a sequence of waypoints for traveling between the two locations (e.g., the first location and the second location). In some cases, waypoints include streets, intersections, global positioning system (GPS) coordinates, etc.

In at least one example, the computing device(s) 704 may store one or more and/or system controllers 726, which may be configured to control steering, propulsion, braking, safety, emitters, communication, and other systems of the vehicle 702. The system controllers 726 may communicate with and/or control corresponding systems of the drive system(s) 714 and/or other components of the vehicle 702, which may be configured to operate in accordance with a route provided from the planning system 724.

In some implementations, the vehicle 702 may connect to computing device(s) 732 via the network(s) 734. For example, the computing device(s) 732 may receive log data 736 from one or more vehicles 702. The log data 736 may include the sensor data 728, perception data, prediction data and/or a combination thereof. In some cases, the log data 728 may include portion of one or more of the sensor data 728, perception data and prediction data.

The computing device 732 may include one or more processors 738 and memory 740 communicatively coupled with the one or more processors 738. In at least one instance, the processor(s) 738 may be similar to the processor(s) 716 and the memory 740 may be similar to the memory 718. In the illustrated example, the memory 740 of the computing device(s) 732 stores the sensor data 728 (including thermal data), the map data 730, the log data 736, and the training data 748. The memory 740 may also store a training component 742, a machine learning component 744, as well as other components 746, such as an operating system.

In some cases, the training component 742 may generate the training data 748 using the sensor data 728, the log data 736, and/or the map data 730 received from one or more vehicles 702. For instance, the training component 742 may label data representative of events with one or more measured parameters or characteristics. The training component 742 may then use the training data 742 to train the machine learning component 744 to generate models for the frame processing system 722 and/or the perception and prediction system 720 in order to assign confidence values to the predicted behaviors and/or states of identified objects, as discussed above.

The processor(s) 716 of the computing device(s) 704 and the processor(s) 738 of the computing device(s) 732 may be any suitable processor capable of executing instructions to process data and perform operations as described herein. By way of example and not limitation, the processor(s) 716 and 738 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 718 of the computing device(s) 704 and the memory 740 of the computing device(s) 732 are examples of non-transitory computer-readable media. The memory 718 and 740 can store an operating system and one or more software applications, instructions, programs, and/or data to implement the methods described herein and the functions attributed to the various systems. In various examples, the memory 718 and 740 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 718 and 740 can be implemented as a neural network.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 7 may utilize the processes and flows of FIGS. 1-6.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A system comprising: one or more processors; and one or more non-transitory computer-readable media storing instructions that, when executed by the one or more processors, cause the one or more processors to perform operations comprising: receiving first lidar data representing a physical environment at a first time, the first lidar data associated with a first position; receiving second lidar data representing the physical environment at a second time after the first time, the second lidar data associated with a second position; determining, based on the first lidar data, first top-down data including a first minimum height value associated with a portion of the first lidar data and a first maximum height value associated with the portion of the first portion of the first lidar data; determining based on the second lidar data, second top-down data including representing a second minimum height value associated with a portion of the second lidar data and representing a second maximum height value associated with the portion of the second lidar data; aligning the first top-down data with the second top-down data such that the portion of the first lidar data aligns with the portion of the second lidar data; determining, based on the alignment, aggregated top-down data wherein the aggregated top-down data includes a multichannel top down representation of the physical environment, a first channel of the multichannel top down representation including absolute minimum height values and a second channel of the multichannel top down representation including maximum height values; determining, based at least in part on the aggregated top-down data, object data associated with an object in the physical environment; and performing, based at least in part on the object data, an operation associated with an autonomous vehicle.

B. The system of claim A, wherein determining the object data further comprises: inputting the aggregated top-down data into a machine learned model; and receiving, from the machine learned model, the object data.

C. The system of claim A, wherein a third channel of the multichannel top down representation includes average intensity values for the height dimension.

D. The system of claim A, wherein the operations further comprising:
receiving third lidar data representing the physical environment at a third time after the second time, the third lidar data associated with a third position; determining based on the third lidar data, third top-down data including representing a third minimum height value associated with a portion of the third lidar data and representing a third maximum height value associated with the portion of the third lidar data; aligning the third top-down data with the first top-down data and the second top-down data such that the portion of the third lidar data aligns with the portion of the first lidar data and the portion of the second lidar data; and wherein the aggregated top-down data includes the portion of the third lidar data.

E. The system of claim A, wherein the transformation is based at least in part on a first pose of the autonomous vehicle at the first location and a second pose of the autonomous vehicle at the second location.

F. A method comprising: receiving first lidar data representing a physical environment at a first time; receiving second lidar data representing the physical environment at a second time; determining, based at least in part on a first location associated with the first lidar data and a second location associated with the second lidar data, a transfer function; determining, based at least in part on the first lidar data, the second lidar data, and the transfer function, aggregated data representing the physical environment, wherein a first channel of the aggregated data represents a first height value for a portion represented in the first lidar data and the second lidar data and a second channel of the aggregated data represents a second height value for the portion; and determining, based at least in part on the aggregated data, object data associated with an object in the physical environment.

G. The method of paragraph F, wherein determining the object data associated with the object in the physical environment further comprises: inputting the aggregated data into a machine learned model; and receiving, from the machine learned model, the object data.

H. The method of paragraph F, further comprising: determining an empty space associated with the physical environment based at least in part on the second lidar data; and filtering the first lidar data to remove data within the empty space prior to generating the transform function.

I. The method of paragraph H, further comprising: generating a first mesh associated with the first lidar data; generating a second mesh associated with the second lidar data; and wherein determining the aggregated data comprises applying the transform function to the first mesh.

J. The method of paragraph F, wherein the aggregated data is top-down aggregated data.

K. The method of paragraph F, further comprising: receiving third lidar data representing the physical environment at a third time; and wherein the aggregated data representing is based at least in part on the third lidar data.

L. The method of paragraph K, further comprising: determining, based at least in part on a third location associated with the third lidar data and the second location associated with the second lidar data, a second transfer function; and wherein the aggregated data representing is based at least in part on the second transfer function.

M. The method of paragraph F, wherein the first height value is a maximum height value and the second height value is a minimum height value.

N. A non-transitory computer-readable medium storing instructions that, when executed, cause one or more processors to perform operations comprising: receiving first lidar data representing a physical environment at a first time; receiving second lidar data representing the physical environment at a second time, the second time subsequent to the first time; determining, based at least in part on a first location associated with the first lidar data and a second location associated with the second lidar data, a transfer function; determining, based at least in part on the first lidar data, the second lidar data, and the transfer function, aggregated data representing the physical environment, wherein a first channel of the aggregated data represents a first height value for a portion represented in the first lidar data and the second lidar data and a second channel of the aggregated data represents a second height value for the portion; and determining, based at least in part on the aggregated top-down data, object data associated with an object in the physical environment.

O. The non-transitory computer-readable medium of paragraph N, wherein the aggregated data is a multichannel top down representation of the physical environment.

P. The non-transitory computer-readable medium of paragraph N, wherein the operations further comprise: determining an empty space associated with the physical environment based at least in part on the second lidar data; and filtering the first lidar data to remove data within the empty space prior to generating the transform function.

Q. The non-transitory computer-readable medium of paragraph P, wherein the operations further comprises: generating a first mesh associated with the first lidar data; generating a second mesh associated with the second lidar data; and wherein determining the aggregated data comprises applying the transform function to the first mesh.

R. The non-transitory computer-readable medium of paragraph N, wherein the first height value is a maximum height value and the second height value is a minimum height value.

S. The non-transitory computer-readable medium of paragraph N, the operations further comprising: receiving third lidar data representing the physical environment at a third time, the third preceding the second time; determining, based at least in part on a third location associated with the third lidar data and the second location associated with the second lidar data, a second transfer function; and wherein the aggregated data representing is based at least in part on the third lidar data and the second transfer function.

T. The non-transitory computer-readable medium of paragraph N, the operations further comprising performing, based at least in part on the object data, at least one operation associated with an autonomous vehicle.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A system comprising:
one or more processors; and
one or more non-transitory computer-readable media storing instructions that, when executed by the one or more processors, cause the one or more processors to perform operations comprising:
receiving first lidar data representing a physical environment at a first time, the first lidar data associated with a first position;
receiving second lidar data representing the physical environment at a second time after the first time, the second lidar data associated with a second position;
determining, based on the first lidar data, first top-down data including a first minimum height value associated with a portion of the first lidar data and a first maximum height value associated with the portion of the first portion of the first lidar data;
determining based on the second lidar data, second top-down data including representing a second minimum height value associated with a portion of the second lidar data and representing a second maximum height value associated with the portion of the second lidar data;
aligning the first top-down data with the second top-down data such that the portion of the first lidar data aligns with the portion of the second lidar data;
determining, based on the alignment, aggregated top-down data wherein the aggregated top-down data includes a multichannel top down representation of the physical environment, a first channel of the multichannel top down representation including absolute minimum height values and a second channel of the multichannel top down representation including maximum height values;
determining, based at least in part on the aggregated top-down data, object data associated with an object in the physical environment; and
performing, based at least in part on the object data, an operation associated with an autonomous vehicle.

2. The system as recited in claim 1, wherein determining the object data further comprises:
inputting the aggregated top-down data into a machine learned model; and
receiving, from the machine learned model, the object data.

3. The system as recited in claim 1, wherein a third channel of the multichannel top down representation includes average intensity values for the height dimension.

4. The system as recited in claim 1, wherein the operations further comprising:
receiving third lidar data representing the physical environment at a third time after the second time, the third lidar data associated with a third position;
determining based on the third lidar data, third top-down data including representing a third minimum height value associated with a portion of the third lidar data and representing a third maximum height value associated with the portion of the third lidar data;
aligning the third top-down data with the first top-down data and the second top-down data such that the portion of the third lidar data aligns with the portion of the first lidar data and the portion of the second lidar data; and
wherein the aggregated top-down data includes the portion of the third lidar data.

5. The system as recited in claim 1, wherein the transformation is based at least in part on a first pose of the autonomous vehicle at the first location and a second pose of the autonomous vehicle at the second location.

6. A method comprising:
receiving first lidar data representing a physical environment at a first time;
receiving second lidar data representing the physical environment at a second time;
determining, based at least in part on a first location associated with the first lidar data and a second location associated with the second lidar data, a transfer function;
determining, based at least in part on the first lidar data, the second lidar data, and the transfer function, aggregated data representing the physical environment, wherein a first channel of the aggregated data represents a first height value for a portion represented in the first lidar data and the second lidar data and a second channel of the aggregated data represents a second height value for the portion; and
determining, based at least in part on the aggregated data, object data associated with an object in the physical environment.

7. The method as recited in claim 6, wherein determining the object data associated with the object in the physical environment further comprises:
inputting the aggregated data into a machine learned model; and
receiving, from the machine learned model, the object data.

8. The method as recited in claim 6, further comprising:
determining an empty space associated with the physical environment based at least in part on the second lidar data; and
filtering the first lidar data to remove data within the empty space prior to generating the transform function.

9. The method as recited in claim 8, further comprising:
generating a first mesh associated with the first lidar data;
generating a second mesh associated with the second lidar data; and
wherein determining the aggregated data comprises applying the transform function to the first mesh.

10. The method as recited in claim 6, wherein the aggregated data is top-down aggregated data.

11. The method as recited in claim 6, further comprising:
receiving third lidar data representing the physical environment at a third time; and
wherein the aggregated data representing is based at least in part on the third lidar data.

12. The method as recited in claim 11, further comprising:
determining, based at least in part on a third location associated with the third lidar data and the second location associated with the second lidar data, a second transfer function; and
wherein the aggregated data representing is based at least in part on the second transfer function.

13. The method as recited in claim 6, wherein the first height value is a maximum height value and the second height value is a minimum height value.

14. One or more non-transitory computer-readable media storing instructions that, when executed, cause one or more processors to perform operations comprising:
receiving first lidar data representing a physical environment at a first time;
receiving second lidar data representing the physical environment at a second time, the second time subsequent to the first time;
determining, based at least in part on a first location associated with the first lidar data and a second location associated with the second lidar data, a transfer function;
determining, based at least in part on the first lidar data, the second lidar data, and the transfer function, aggregated data representing the physical environment, wherein a first channel of the aggregated data represents a first height value for a portion represented in the first lidar data and the second lidar data and a second channel of the aggregated data represents a second height value for the portion; and
determining, based at least in part on the aggregated top-down data, object data associated with an object in the physical environment.

15. The one or more non-transitory computer-readable media as recited in claim 14, wherein the aggregated data is a multichannel top down representation of the physical environment.

16. The one or more non-transitory computer-readable media as recited in claim 14, wherein the operations further comprise:
determining an empty space associated with the physical environment based at least in part on the second lidar data; and
filtering the first lidar data to remove data within the empty space prior to generating the transform function.

17. The one or more non-transitory computer-readable media as recited in claim 16, wherein the operations further comprises:
generating a first mesh associated with the first lidar data;
generating a second mesh associated with the second lidar data; and
wherein determining the aggregated data comprises applying the transform function to the first mesh.

18. The one or more non-transitory computer-readable media as recited in claim 14, wherein the first height value is a maximum height value and the second height value is a minimum height value.

19. The one or more non-transitory computer-readable media as recited in claim 14, the operations further comprising:
receiving third lidar data representing the physical environment at a third time, the third preceding the second time;
determining, based at least in part on a third location associated with the third lidar data and the second location associated with the second lidar data, a second transfer function; and
wherein the aggregated data representing is based at least in part on the third lidar data and the second transfer function.

20. The one or more non-transitory computer-readable media as recited in claim 14, the operations further comprising performing, based at least in part on the object data, at least one operation associated with an autonomous vehicle.

* * * * *